US012807315B2

(12) United States Patent
Hamzaoui et al.

(10) Patent No.: US 12,807,315 B2
(45) Date of Patent: Nov. 24, 2026

(54) ERGONOMIC HEADREST FOR A SEAT

(71) Applicant: Safran Seats, Plaisir (FR)

(72) Inventors: Mariem Hamzaoui, Moissy-Cramayel (FR); Houssem Arroum, Moissy-Cramayel (FR); Slim Ben Frej, Moissy-Cramayel (FR); Belhassen Chihi, Moissy-Cramayel (FR)

(73) Assignee: Safran Seats, Plaisir (FR)

( * ) Notice: Subject to any disclaimer, the term of this patent is extended or adjusted under 35 U.S.C. 154(b) by 74 days.

(21) Appl. No.: 18/848,625

(22) PCT Filed: Mar. 8, 2023

(86) PCT No.: PCT/EP2023/055837
§ 371 (c)(1),
(2) Date: Sep. 19, 2024

(87) PCT Pub. No.: WO2023/186473
PCT Pub. Date: Oct. 5, 2023

(65) Prior Publication Data

US 2025/0206445 A1 Jun. 26, 2025

(30) Foreign Application Priority Data

Mar. 30, 2022 (FR) ........................................ 2202861

(51) Int. Cl.
*B64D 11/06* (2006.01)
*B60N 2/806* (2018.01)
(Continued)

(52) U.S. Cl.
CPC .......... *B64D 11/0642* (2014.12); *B60N 2/806* (2018.02); *B60N 2/874* (2018.02); *B60N 2/885* (2018.02); *B64D 11/0646* (2014.12)

(58) Field of Classification Search
CPC ............ B64D 11/0642; B64D 11/0646; B60N 2/885; B60N 2/806; B60N 2/809; B60N 2/868; B60N 2/874
See application file for complete search history.

(56) References Cited

U.S. PATENT DOCUMENTS 5,108,150 A 4/1992 Stas et al.
6,129,421 A 10/2000 Gilson et al.
(Continued)

FOREIGN PATENT DOCUMENTS

DE 8810569 U1 12/1988
DE 102017107153 A1 10/2018
FR 2795372 A1 12/2000

OTHER PUBLICATIONS

International Appl. No. PCT/EP2023/055837, International Search Report, Translation of International Search Report, and Written Opinion, dated Jun. 5, 2023, 14 pages.

(Continued)

*Primary Examiner* — Syed A Islam
(74) *Attorney, Agent, or Firm* — Kilpatrick Townsend & Stockton LLP

(57) ABSTRACT

A headrest for a seat includes a central part and a movable part movable between an upright position and a deployed position. The movable part has two lateral head-supporting wings, each lateral head-supporting wing being mounted on a corresponding end of a support by way of an end pivot connection having an end axis of rotation. Each end axis of rotation has a substantially vertical orientation when the movable part is in the upright position and a substantially perpendicular orientation with respect to the central part when the movable part is in the deployed position, such that each lateral wing is able to turn about the corresponding end
(Continued)

axis of rotation in order to adopt an upright position in which the lateral wing is brought close to a cheek of the passenger.

15 Claims, 9 Drawing Sheets

(51) Int. Cl.
*B60N 2/874* (2018.01)
*B60N 2/885* (2018.01)

(56) References Cited

U.S. PATENT DOCUMENTS

| | | | | |
|---|---|---|---|---|
| 6,474,734 | B1 | 11/2002 | Masuda et al. | |
| 11,008,106 | B2 * | 5/2021 | Parrilla Calle ........ | B60N 2/888 |
| 2008/0185894 | A1 * | 8/2008 | Yetukuri ................ | B60N 2/885 297/406 |
| 2012/0139309 | A1 | 6/2012 | Gaither et al. | |
| 2012/0292973 | A1 * | 11/2012 | Westerink .............. | B64D 11/06 297/391 |
| 2020/0346758 | A1 | 11/2020 | Parrilla Calle et al. | |
| 2022/0063469 | A1 * | 3/2022 | Clough .................. | B60N 2/824 |

OTHER PUBLICATIONS

International Application No. PCT/EP2023/055837, International Preliminary Report on Patentability mailed on Oct. 10, 2024, 19 pages.

* cited by examiner

[Fig. 1a]
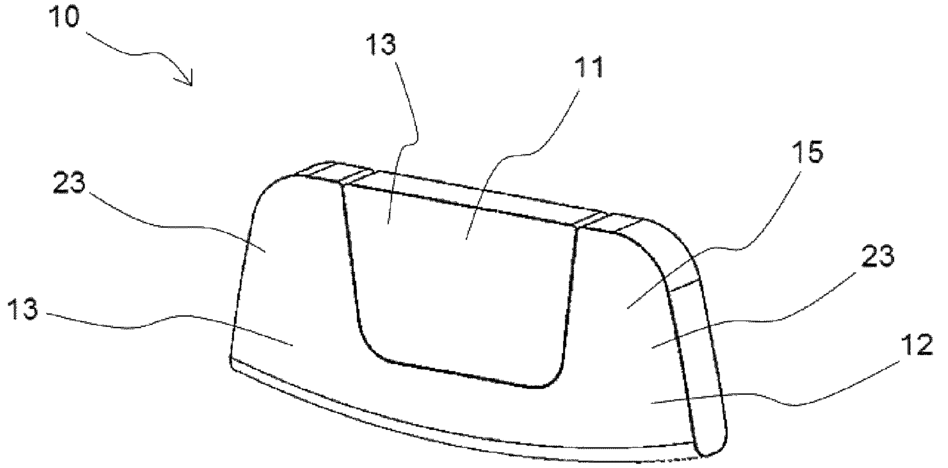
[Fig. 1b]
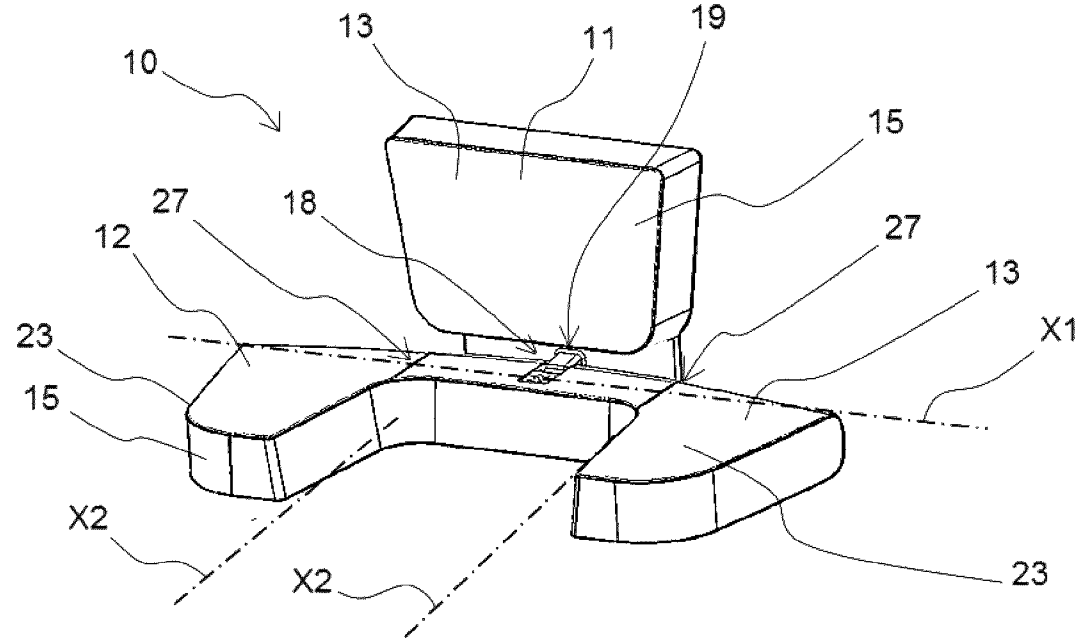

[Fig. 2]
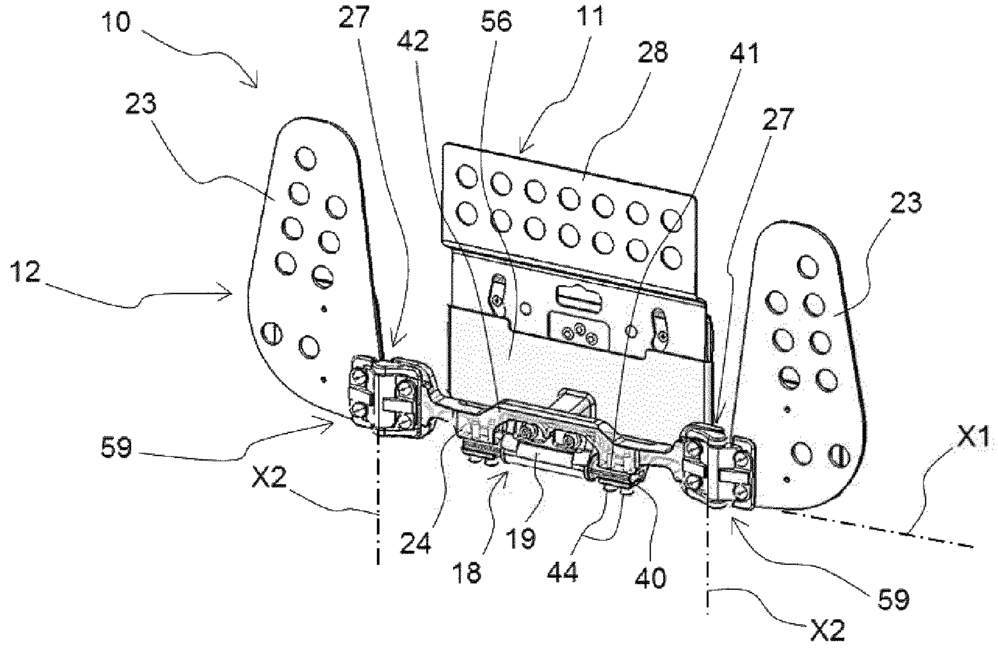
[Fig. 3]
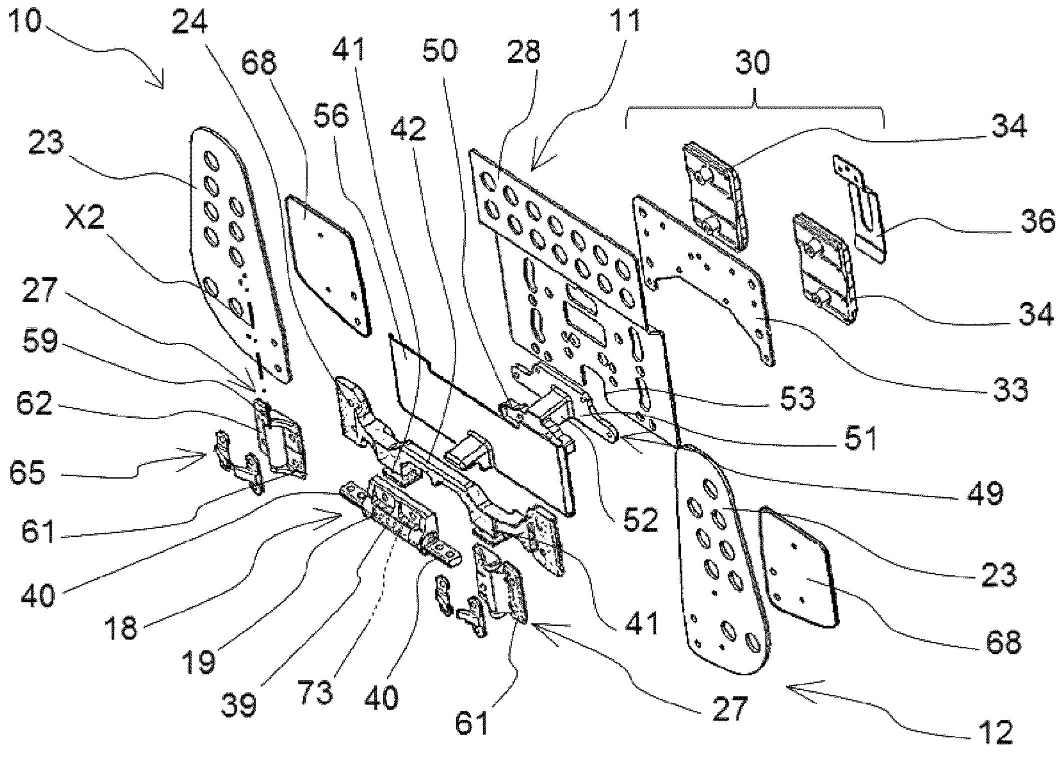

[Fig. 4a]
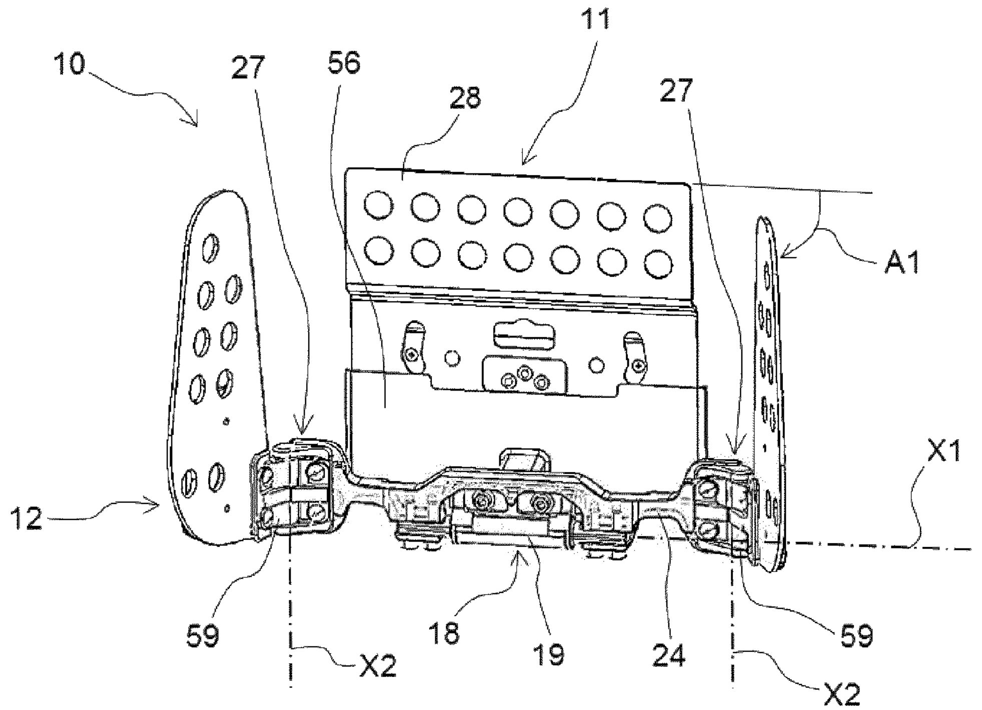
[Fig. 4b]
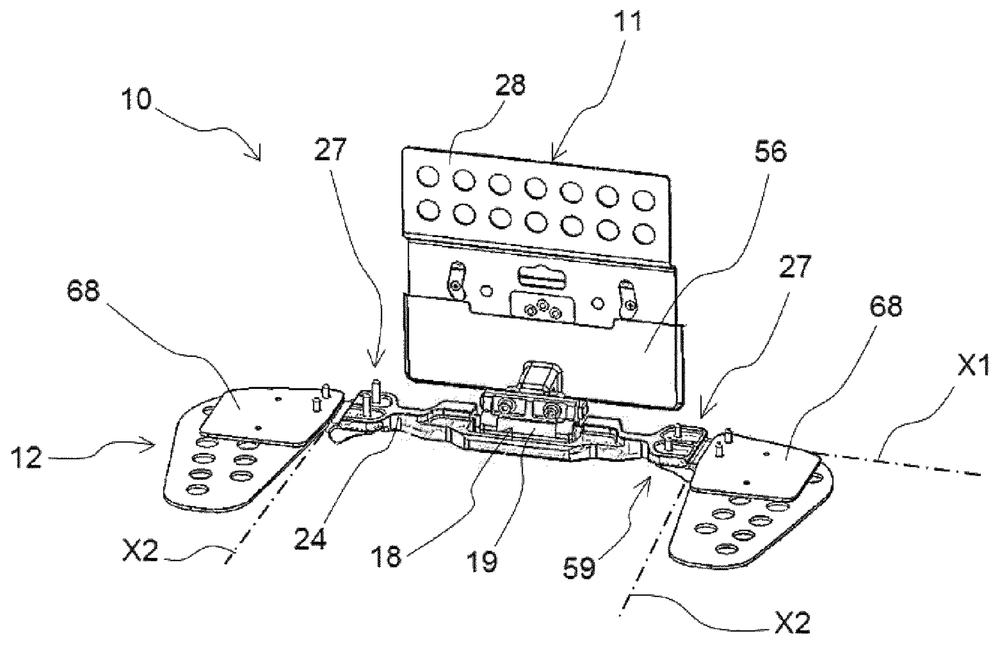

[Fig. 4c]
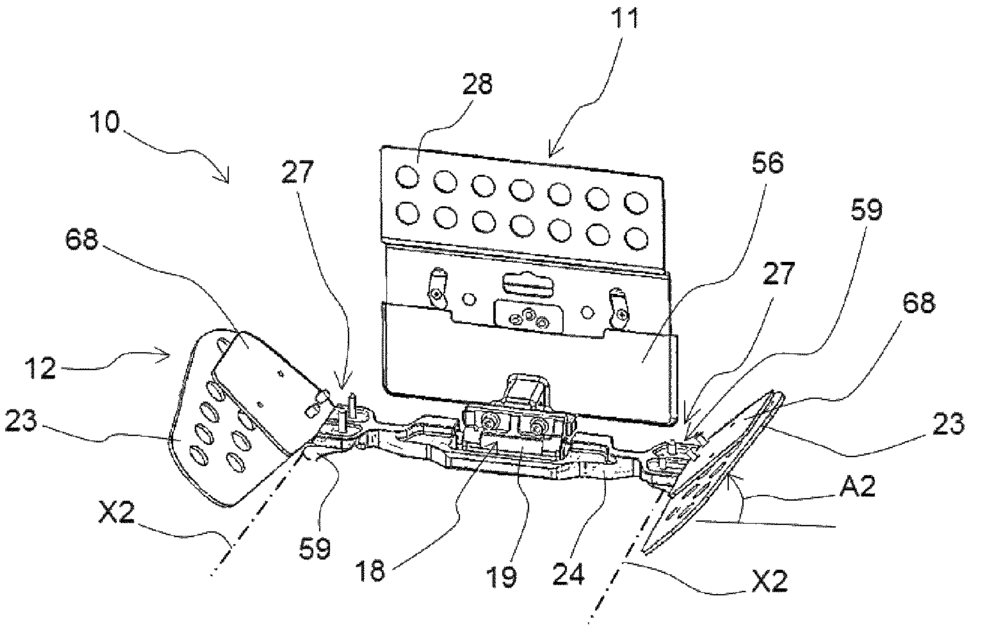
[Fig. 5]
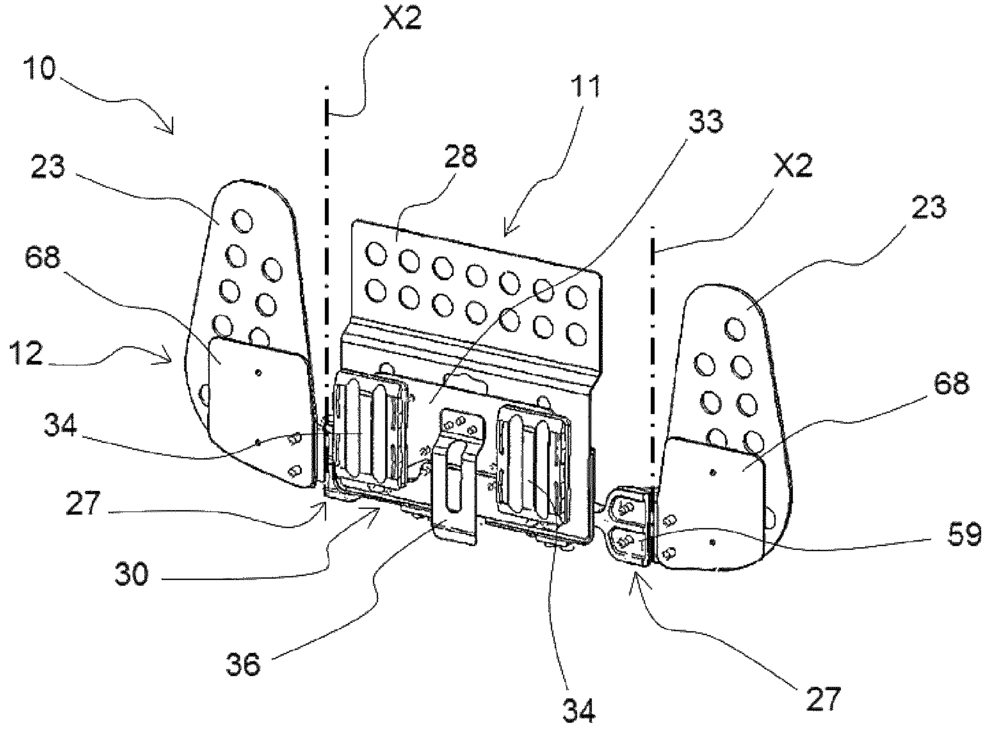

[Fig. 6]
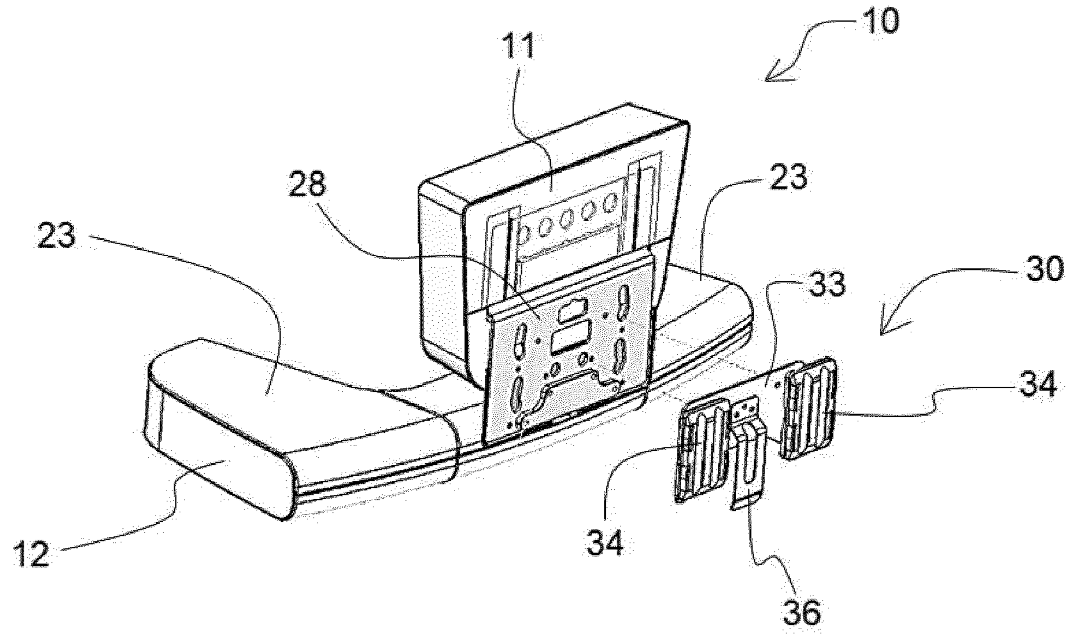
[Fig. 7]
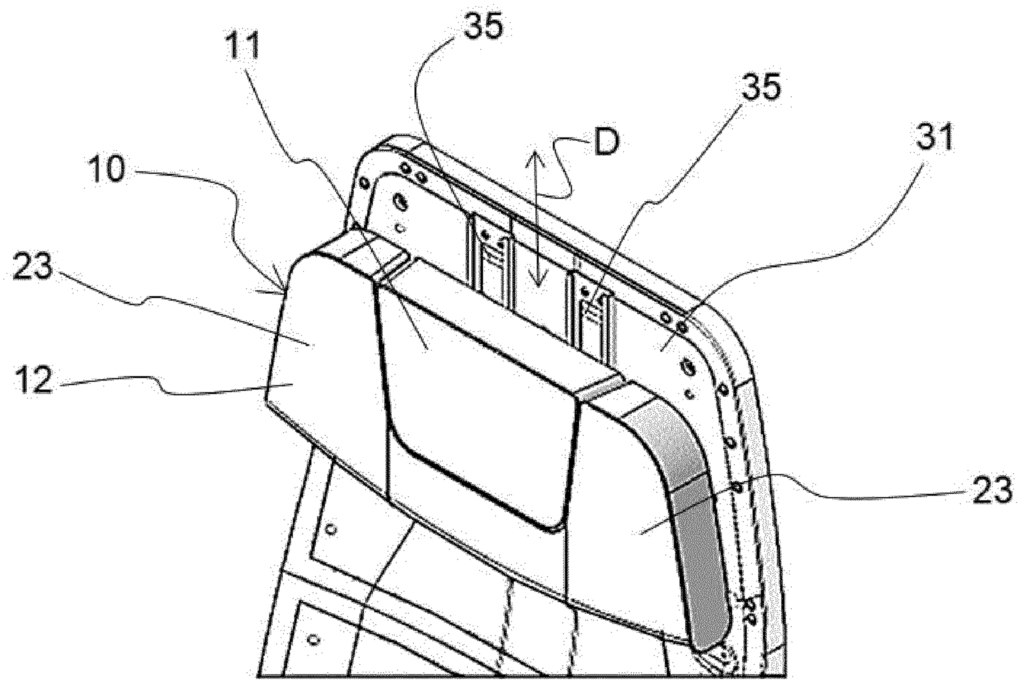

[Fig. 8]
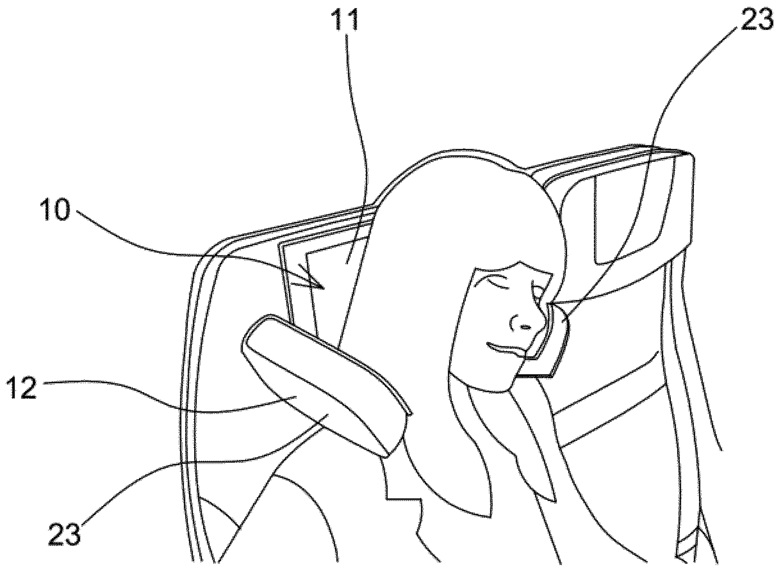
[Fig. 9]
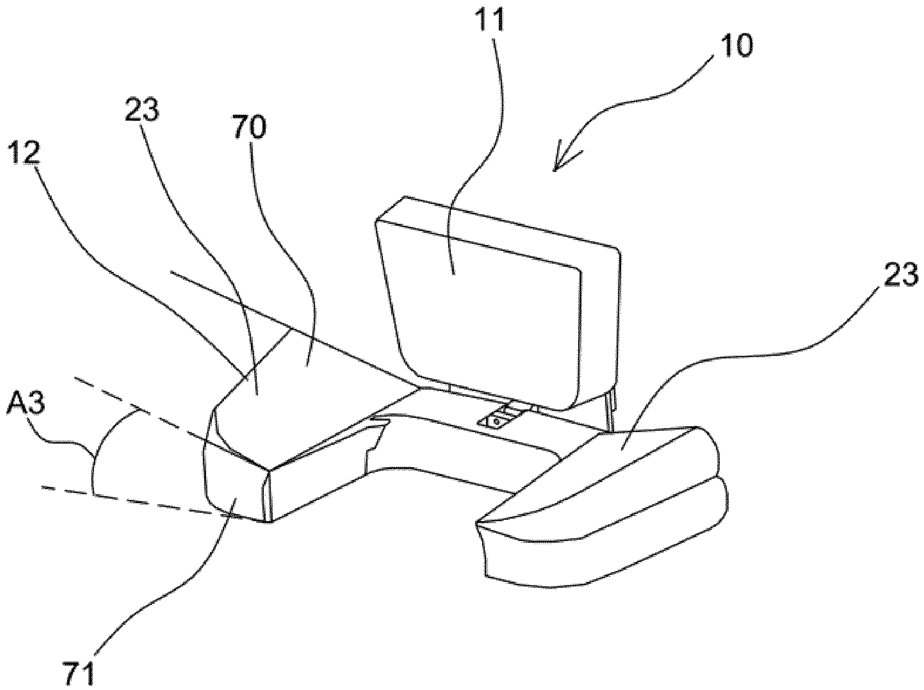

[Fig. 10a]
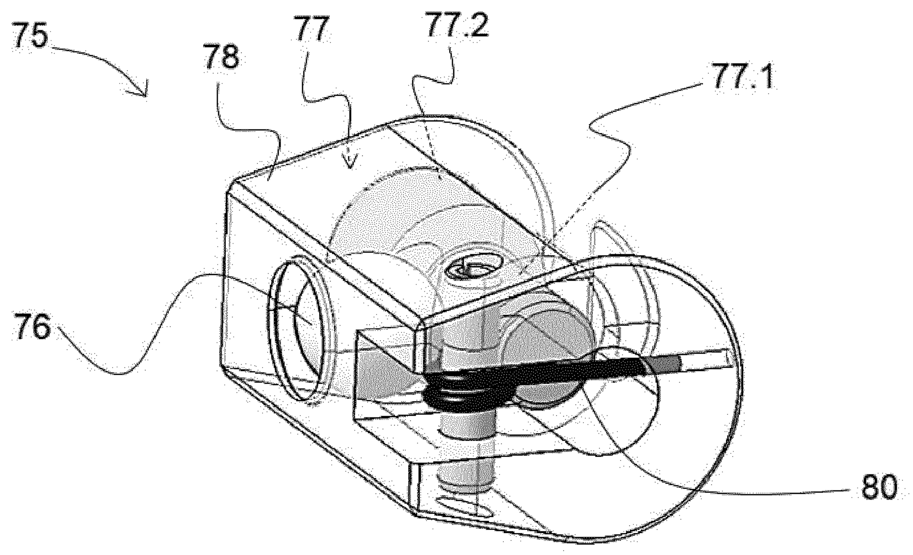
[Fig. 10b]
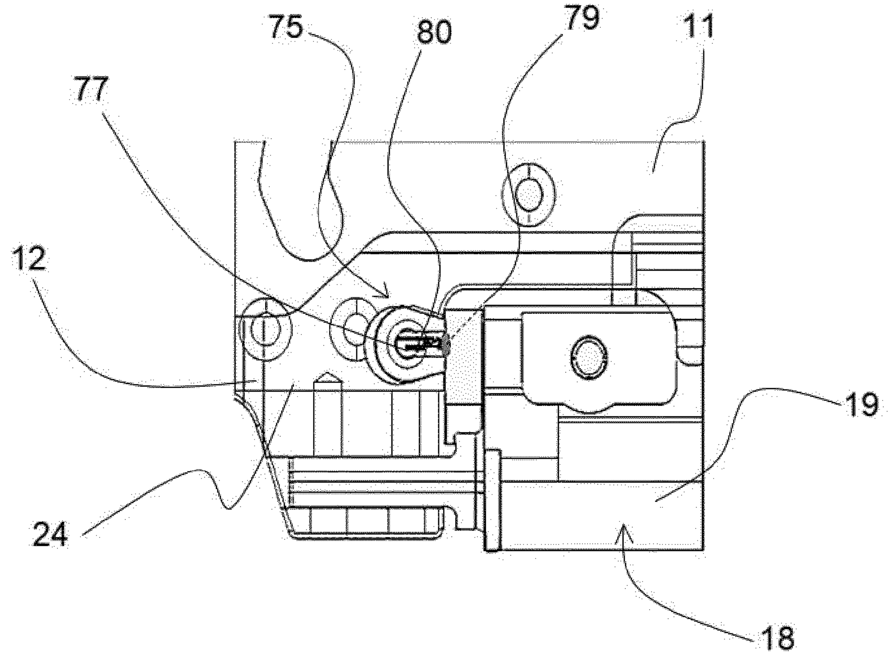

[Fig. 11a]
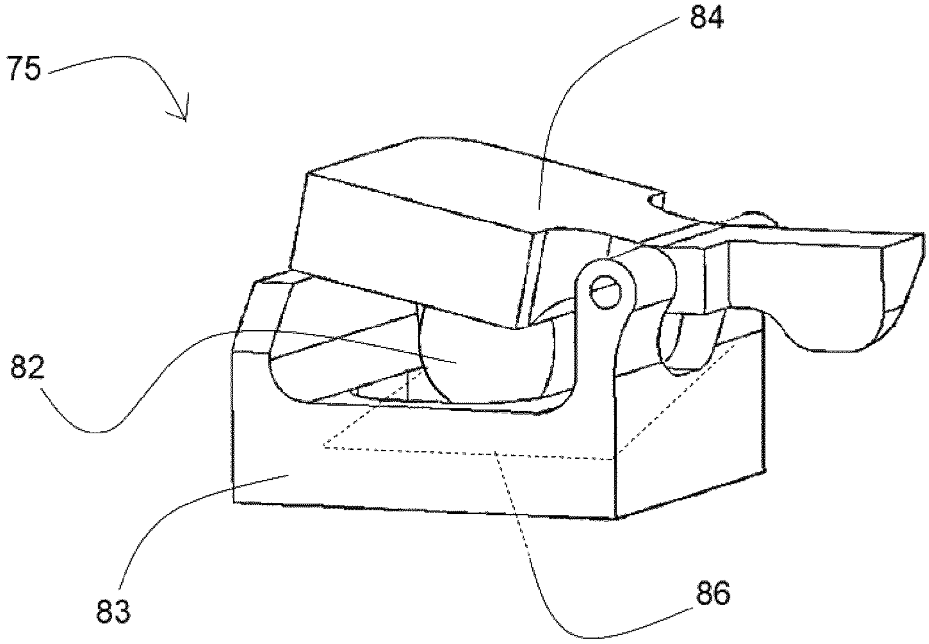
[Fig. 11b]
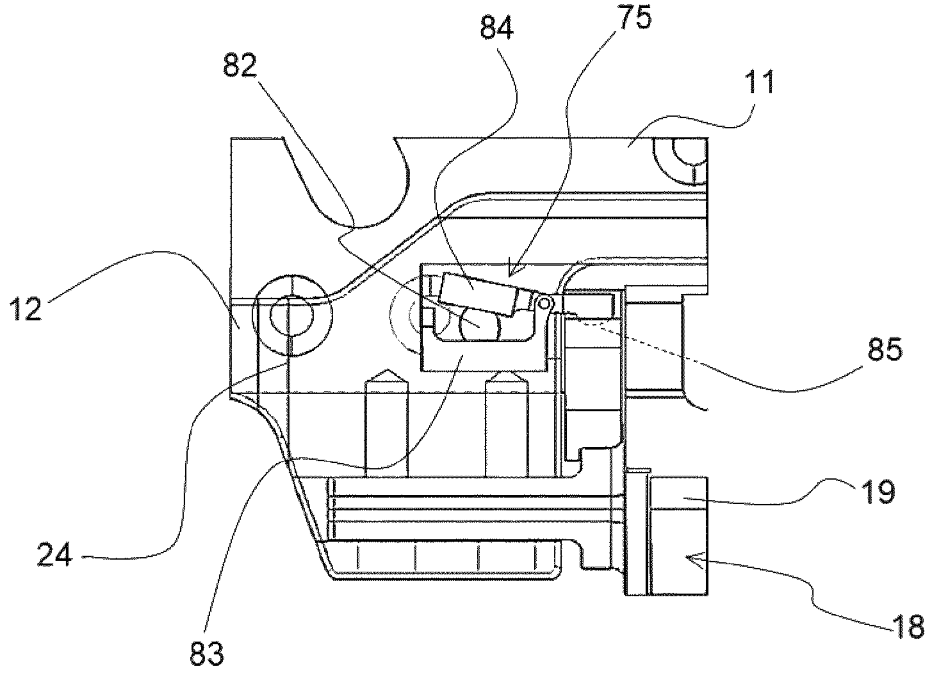

[Fig. 12a]
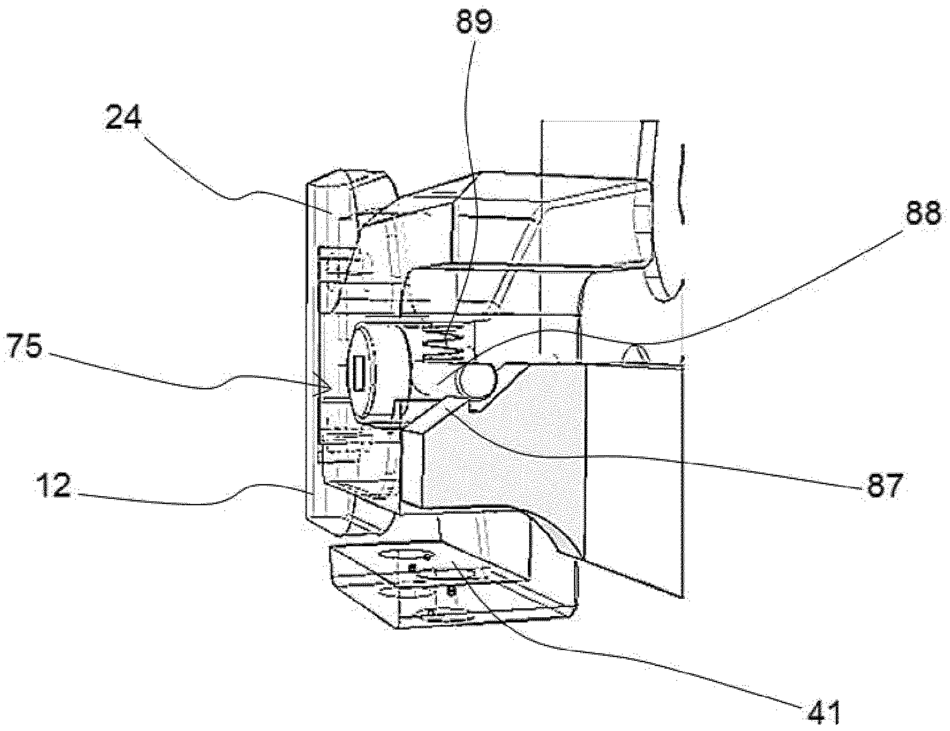
[Fig. 12b]
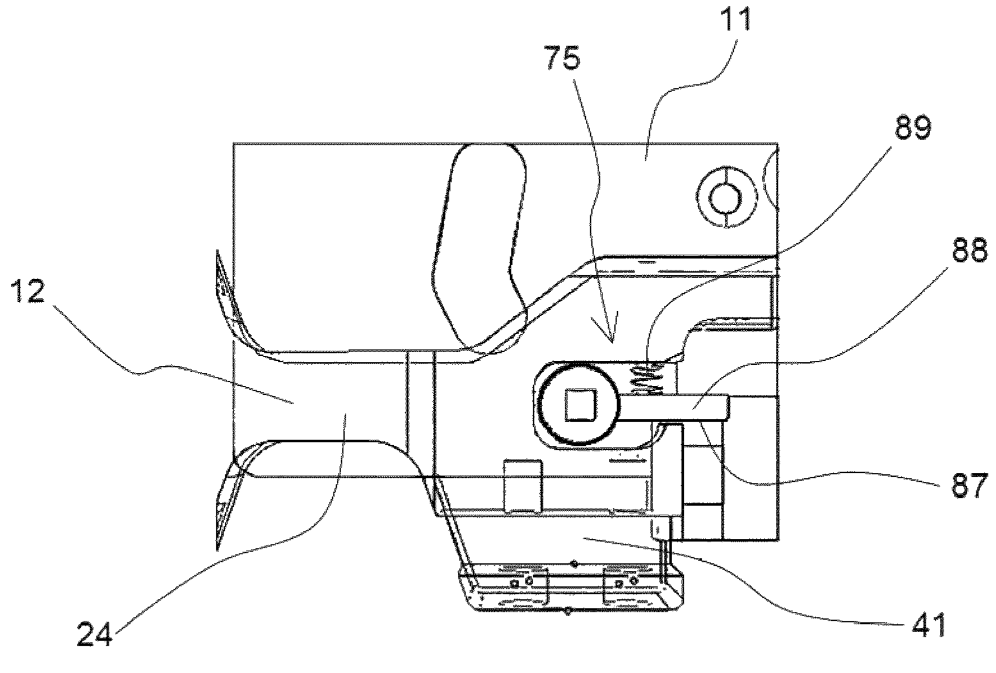

ERGONOMIC HEADREST FOR A SEAT

CROSS REFERENCE TO RELATED APPLICATIONS

This application is a U.S. national phase under 35 U.S.C. § 371 of International Patent Application No. PCT/EP2023/055837, filed on Mar. 8, 2023, which claims priority to France Patent Application No. 2202861, filed on March 30, 2022, the entire contents of both of which are incorporated herein by reference in their entireties.

The present invention relates to an ergonomic headrest for a seat. The invention finds a particularly advantageous, but not exclusive, application with aircraft seats for economy classes. However, the invention could also be implemented with aircraft seats for business classes or with seats for other means of transport, such as for example seats in motor vehicles, trains, or boats.

In a manner known per se, a headrest for an aircraft seat of economy class is mounted on a seat back via a headrest structure. The headrest can be movable between a high position and a low position in which the headrest is substantially parallel to the plane of the seat back. Document US2012/0139309 discloses the production of a seat headrest comprising a central part and fins mounted on the central part of the headrest via pivot connections having a horizontal axis. Each fin is thus movable between a raised position and a deployed position in which the movable part extends substantially perpendicular to the central part and the seat back. The passenger can then lay her/his head on the upper face of the fins.

However, such a headrest offers reduced support for the passenger's head, who wants to sleep comfortably. The passenger may therefore be forced to lay her/his head on the back of the front seat back, on the table of the same seat, or sometimes on the shoulders of the neighboring passenger, thus forming risk of muscular fatigue or respiratory failure.

The objective of the invention is to effectively remedy this drawback by proposing a headrest for a seat, in particular an aircraft seat, comprising:

- a central part against which the head of a passenger can rest, and
- a movable part mounted on the central part via a central pivot connection having a horizontal axis of rotation, said central pivot connection being arranged on a lower edge of the central part, so that the movable part is movable between a raised position and a deployed position in which the movable part extends substantially perpendicular to the central part,
- said movable part comprises two lateral head support fins, each lateral head support fin being mounted on a corresponding end of a support via an end pivot connection having an end axis of rotation,
- each end axis of rotation having a substantially vertical orientation when the movable part is in the raised position,
- each end axis of rotation having an orientation substantially perpendicular to the central part when the movable part is in the deployed position, so that each lateral head support fin is able to rotate about the corresponding end axis of rotation in order to take a raised position in which the side head support fin is brought closer to a cheek of the passenger.

The invention thus allows, thanks to the presence of the movable part, to offer a large support surface on which the passenger can lay and maintain her/his head in a comfortable position. When it is in the deployed position, the mobile part also has the advantage of being able to be positioned as close as possible to the surface of a cheek of the passenger via the rotation of the fins about the corresponding end axis of rotation. The mobile part also provides evenly distributed support on the passenger's cheek. The mobile part also has the advantage of offering neck support to the passenger.

According to one embodiment of the invention, the movable part is U-shaped.

According to one embodiment of the invention, said headrest is movable between a high position and a low position so that it can be adapted to different sizes of passengers.

According to one embodiment of the invention, the movable part extends parallel to the central part when the headrest is in the raised position.

According to one embodiment of the invention, the central pivot connection is formed by a rotating friction member for maintaining the movable part selectively in the stored position or in the deployed position.

According to one embodiment of the invention, each end pivot connection is formed by a hinge having a first portion fixed on one end of the support and a second portion fixed on a corresponding head support fin.

According to one embodiment of the invention, said headrest comprises a modular fixation interface for a backrest structure.

According to one embodiment of the invention, the modular fixation interface comprises two pads for cooperating with respective guide rails carried by the backrest structure.

According to one embodiment of the invention, the modular fixation interface further comprises a clip forming a stop when the headrest is in the previously defined high position.

According to one embodiment of the invention, said headrest comprises an elastic return member for automatically moving the movable part from the deployed position to the stored position when the passenger's head is not laid on the movable part.

According to one embodiment of the invention, when the movable part is in the deployed position, an upper face of a side fin forms a fixed non-zero angle relative to a lower face of said side fin.

According to one embodiment of the invention, each end pivot connection comprises a limiting device for the angle of rotation of the corresponding side fin.

According to one embodiment of the invention, said headrest comprises a retaining device for the movable part under the action of a strong acceleration of the headrest.

According to one embodiment of the invention, the retaining device comprises a ball associated with a rod mounted so as to slide between a default position and an active position in which the rod pushes said ball into a housing in order to block the rotation of the movable part relative to the central part, the passage from the default position to the active position of the rod occurring under the action of the strong acceleration for the headrest.

According to one embodiment of the invention, an elastic member presses the rod into the rest position when the headrest is strongly accelerated.

According to one embodiment of the invention, the retaining device comprises a ball and a part fixed on the movable part of the headrest, said part carrying a pivoting latch capable of rotating under the effect of a movement of the ball generated by acceleration so as to block the moving part of the headrest.

According to one embodiment of the invention, the retaining device is provided with a hard point so that it can be activated at the start of a downward rotation sequence over a determined angular range in which an applied force for deploying the movable part of the headrest is greater than an effort necessary to deploy the movable part over the remainder of a rotation sequence from the end of the predetermined angular range to the deployed position.

The objective of the invention is also a seat comprising a headrest such than previously defined.

The invention will be better understood and other characteristics and advantages will appear by reading the following detailed description, which includes embodiments given for illustrative purposes with reference to the accompanying figures, presented as way of non-limiting examples, which may serve to complete the understanding of the present invention and the description of its implementation and eventually contribute to its definition, wherein:

FIGS. 1*a* and 1*b* are respectively perspective views of the headrest according to the invention when the movable part is in the stored position and in the deployed position;

FIG. 2 is a perspective view of the headrest according to the invention without the layers of flexible materials covering its structural parts;

FIG. 3 is an exploded perspective view of the headrest according to the present invention;

FIGS. 4*a*, 4*b*, 4*c* are perspective views illustrating different possible configurations of the headrest according to the present invention;

FIG. 5 is a perspective view of the rear part of the headrest according to the invention;

FIG. 6 is a perspective view of the modular fixation interface disassembled from the headrest according to the invention;

FIG. 7 is a perspective view illustrating the assembly of the headrest according to the invention on a backrest structure;

FIG. 8 is a view showing a passenger having a cheek bearing against a fin of the headrest according to the invention in the deployed position;

FIG. 9 is a perspective view of the headrest according to the invention illustrating an embodiment in which the fins have a trapezoidal cross section;

FIGS. 10*a* and 10*b* illustrate a first embodiment of a retaining device for the movable part when the headrest is strongly accelerated;

FIGS. 11*a* and 11*b* illustrate a second embodiment of a retaining device for the movable part when the headrest is strongly accelerated;

FIGS. 12*a* and 12*b* illustrate a third embodiment of a retaining device for the movable part when the headrest is strongly accelerated.

It should be noted that, in the figures, the structural and/or functional elements common to the different embodiments may have the same references. Thus, unless otherwise stated, such elements have identical structural, dimensional and material properties.

The relative terms such as "horizontal", "vertical", "lower", "upper", are understood by reference to their common meaning when the headrest is in the position of use on a seat.

Expressions of the type "substantially horizontal" or "substantially vertical" or "substantially perpendicular" mean that there may be a slight angular offset, less than 20 degrees relative to the direction indicated.

FIGS. 1*a* and 1*b* show a headrest 10 for a seat, in particular an aircraft seat. The headrest 10 comprises a central part 11 on which a passenger's head as well as a movable part 12 can be laid. The central part 11 and the movable part 12 are covered by a layer of flexible material 13, such as for example a layer of foam, itself covered by a cover 15.

The generally U-shaped movable part 12 is mounted on the central part 11 of the headrest 10 via at least one central pivot connection 18 having a horizontal axis X1 clearly visible in the figures as well as FIGS. 4*a*, 4*b*, and 4*c*. The central pivot connection 18 is arranged on a lower edge of the central part 11. The horizontal axis X1 is parallel to the lower edge of the central part 11.

Thus, the movable part 12 is movable between a raised position in which the movable part 12 extends parallel to the central part 11, preferably in the same plane as the central part 11, and a deployed position in which the movable part 12 extends substantially perpendicular to the central part 11. In the deployed position, the movable part 12 then extends substantially in a horizontal plane.

In this case, the central pivot connection 18 is formed by a rotating friction member 19 in order to maintain the movable part 12 selectively in the stored position or in the deployed position. Preferably, the rotating friction member 19 is of the asymmetrical type, that is to say it requires a greater torque in the direction of deployment than in the direction of retraction towards the raised position.

The movable part 12 comprises two side head support fins 23. In this case, the side fins 23 are each formed by a plate of generally trapezoidal shape. Alternatively, the side fins 23 may however have a square, rectangular, triangular shape, or any other shape adapted to the application.

Each side fin 23 is mounted on a corresponding end of a support 24 of the movable part 12 via an end pivot connection 27 having an end axis of rotation X2.

When the movable part 12 is in the raised position, the end axis of rotation X2 has an orientation substantially parallel to a lateral edge of the central part 11. It is thus possible to adapt the angular position of the fin 23 to a lateral rotation about the end axis of rotation X2 so as to bring the fin 23 closer to the passenger's cheek, as shown in FIG. 4*a*. The angle of lateral movement A1 of a fin about the axis X2 is between 30 and 90 degrees and is preferably of the order of 75 degrees. By "of the order of", we mean a possible variation of 10% around the indicated value.

When the movable part 12 is in the deployed position, the end axis of rotation X2 has an orientation substantially perpendicular to the central part 11. The axis of rotation X then extends in a substantially horizontal plane. Each side fin 23 is then movable between a default position in which the side fin 23 is in the same plane as the movable part 12 and a raised position in which the side fin 23 is directed upwards and forms a non-zero angle with respect to a horizontal plane, as shown in FIG. 4*c*. The side fin 23 can thus be brought closer to the passenger's cheek to improve comfort. The angle of movement A2 of the side fin 23 between the default position and the raised position is for example between 30 and 70 degrees and is preferably of the order of 55 degrees.

More precisely, as it can be seen in FIGS. 2 and 3, the central part 11 comprises a structural plate 28 on which a modular fixation interface 30 is mounted, allowing the fixation of the headrest 10 on a backrest structure 31. The modular fixation interface 30, also visible in FIGS. 5 and 6, comprises a support plate 33 on which two pads 34 are fixed. These pads 34 are each intended to cooperate with a guide rail 35 carried by the backrest structure 31, as shown in FIG. 7. When the seat is in the raised position, the guide rails 35 have a substantially vertical orientation. The headrest 10 is thus movable in translation relative to the backrest structure

31 between a high position and a low position so as to be able to adapt to the different sizes of the passengers.

Such a configuration has the advantage of modifying only the configuration of the fixation interface 30, in particular the spacing between the pads 34, so that the headrest 10 can be adapted to different models of seats whose spacing between the rails 35 is likely to vary from one model to another.

Preferably, the modular fixation interface 30 further comprises a clip 36 forming a stop for bearing against a fixed element of the seat structure, for example a pin, when the headrest 10 is in an extreme high position. The clip 36 may be L-shaped is made of a metallic material so that the operator can deform the clip 36 in order to separate the headrest 10 from the backrest structure 31 during a maintenance operation.

The movable part 12 comprises an elongated support 24 extending longitudinally along the lower edge of the structural plate 28. The elongated support 24 is mounted on the central part 11 via the rotating friction member 19. For this purpose, the rotating friction member 19 comprises a body 39 and two end arms 40 movable in rotation relative to the body 39. The end arms 40 may have a non-circular section, in particular a rectangular section.

Each end arm 40 cooperates with a groove 41 in one end of a central portion 42 in the form of a bridge of the elongated support 24. In order to ensure the mechanical connection between the end arms 40 and the elongated support 24, one or more clamping screws 44 visible in FIG. 2 are inserted inside through holes in a wall of the groove 41 and a corresponding end arm 40. Each clamping screw 44 cooperates with a tapped hole in the elongated support 24. Alternatively, the mechanical connection between the end arms 40 and the elongated support 24 can be ensured by welding, bonding, or force fitting of the arms end 40 into the corresponding grooves 41.

Furthermore, the body 39 of the friction member is fixed to a central structural part 49 called a "nose". This nose 49 comprises two parts 50, 51 parallel to each other and separated by a spacer 52 inserted into a notch 53 in a lower edge of the structural plate 28. The rear part of the nose 49 is fixed on the rear face of the structural plate 28 by screwing, riveting, gluing welding, any other fixing technique adapted to the application. The body 39 of the rotating member 19 is fixed on a front face of the nose 49 by means of fixing members, such as screws or rivets. Alternatively, the body 39 of the rotating member 19 could be welded or glued to the nose 49. This depends on the application.

A cover 56 may cover at least part of the nose 49 and a front face of the structural plate 28. This cover 56 has an aesthetic function, insofar as it aims to hide the metallic structural parts of the headrest. 10 when the mobile part 12 is in the deployed position.

Each end of the central portion 42 in the form of a bridge is extended by one end of the support 24 on which an end pivot connection 27 is mounted. In this case, each end pivot connection 27 is formed by a hinge 59 having a first portion 61 fixed on the end of the support 24 and a second portion 62 fixed on the side fin 23. The two portions 61, 62 are articulated together about the end axis of rotation X2. The fixing members used to ensure the fixing between a portion 61, 62 of the hinge 59 and a corresponding element (support 24 or side fin 23) may have the form of screws, rivets, or any other fixing member suitable to the application. The hinge 59 may have the form of a friction hinge.

Each end pivot connection 27 may be provided with a limiting device 65 for the angle of rotation of the corresponding side fin 23. This device 65 comprises two T-shaped parts, each associated with a portion of the hinge 59 and bearing against one another when the side fin 23 has reached its limit angle of rotation.

A reinforcing plate 68 can be fixed on a corresponding side fin 23. The reinforcing plate 68 can be fixed on a rear face of the side fin 23 by screwing, riveting, welding, gluing, or any other fixing technique adapted to the application.

In the embodiment in FIG. 9, when the movable part 12 is in the deployed position, an upper face 70 of a side fin 23 can form a fixed non-zero angle A3 with respect to a lower face 71 of said side fin 23. This allows to limit the angular movement of the side fins 23 when the movable part 12 is in the deployed position. The inclination of the upper face 70 relative to the lower face 71 of the side fin 23 can be obtained by the layer of flexible material 13 having a trapezoidal cross section.

The headrest 10 may include an elastic return member 73 visible in FIG. 3. This elastic return member 73 permits to automatically move the movable part 12 from the deployed position to the stored position when the passenger's head does not lay on the mobile part 12. The elastic return member 73 could for example have the form of a torsion spring integrated in the central pivot connection 18.

The operation of the headrest 10 according to the invention on a backrest structure 31 is described below. Initially, the passenger can adapt the vertical position of the headrest 10 by sliding it along the rails. carried by the backrest structure 31, in direction D shown in FIG. 7.

When the mobile part 12 is in a raised position, the passenger can rotate the side fins 23 about the end axes of rotation X2 then having a vertical orientation. The passenger can thus choose either to leave the side fins 23 in the plane of the central part 11, or to bring the side fins 23 closer to her/his cheeks in order to improve the lateral support of her/his head, as illustrated in FIG. 4*a*.

In order to put her/his head into a comfortable position during a rest phase the passenger pulls the mobile part 12 downwards. The mobile part 12 then rotates about the horizontal axis of rotation X1 and moves into the deployed position, as illustrated in FIGS. 1*b* and 4*b*.

The passenger can then cause a side fin 23 to rotate about its end axis of rotation so that it can move into a raised position, such as illustrated in FIGS. 4*c* and 8. The upper face of the side fin 23 is then brought closer to the passenger's cheek in order to improve her/his comfort.

Alternatively, all the pivot connections may have the same configuration, that is to say all of the pivot connections can have the form of friction hinges 59 or rotating friction members 19.

Advantageously, as illustrated in FIGS. 10 to 12, the headrest 10 comprises a retaining device 75 for the movable part 12 under the action of a strong acceleration of the headrest 10. This retaining device 75 permits in particular to avoid uncontrolled movement of the mobile part 12 of the headrest 10 during an impact against the aircraft.

In the embodiment in FIGS. 10*a* and 10*b*, the retaining device 75 comprises a ball 76 associated with a rod 77 mounted so as to slide relative to a fixed support 78 mounted on the movable part 12 between a default position and an active position in which the rod 77 pushes said ball 76 into a housing 79 in the central part 11 in order to block the rotation of the movable part 12 relative to the central part 11, the passage from the default position to the active position of the rod 77 occurring under the action of the strong acceleration of the headrest 10.

For this purpose, the rod 77 comprises a small diameter portion 77.1 placed opposite the ball 76 when the rod 77 is in the default position, so that the ball 76 is released from the housing in one of the parts among the fixed central part 11 and the movable part 12 of the headrest 10. The rod 77 comprises a large diameter portion 77.2 for applying a radial force to the ball 76 so as to push it into the housing, when the rod 77 is in the active position. The rod 77 is oriented in the direction of the acceleration or the headrest 10.

An elastic member 80, such as a spring arm, biases the rod 77 in the rest position when the headrest 10 is not strongly accelerated. This elastic member 80 allows to define the resistance force from which the rod 77 moves from the rest position to the active position.

Alternatively, the structure could be inverted, that is to say the fixed support 78 could be mounted on the central part 11 while the housing 79 for receiving the ball 76 is provided in the movable part 12.

In the embodiment in FIGS. 11*a* and 11*b*, the retaining device 75 comprises a ball 82 and a support part 83 fixed on the movable part 12 of the headrest 10. The part 83 carries a pivoting latch 84 capable of rotating under the effect of a movement of the ball 82 generated by the acceleration so as to block the movable part 12 of the headrest 10. For this purpose, one end of the latch 84 can be housed inside a housing 85 in the central part 11 of the headrest 10. In order to ensure the rotation of the latch 84, the ball 82 can roll on an inclined face 86 formed in the part 83 or the latch 84.

The ball 82 is thus movable between a rest position in which the ball 82 is located on the side of the lowest level of the inclined face 86, so that the latch 84 is released from the housing 85 and an active position in which the ball 82 is located on the side of the highest level of the inclined face 86, so that the latch 84 cooperates with the housing 85 in the central part 11.

Alternatively, the structure could be inverted, that is to say the support part 83 can be mounted on the central part 11 while the housing 85 for receiving the latch 84 is provided in the mobile part 12.

Thus, in the first two embodiments, the retaining device 75 comprises a movable element (the rod 77 or the ball 82) capable of moving, under the action of a strong acceleration, towards an active position allowing to ensure the blocking of the movable part 12 relative to the central part 11.

In the embodiment in FIGS. 12*a* and 12*b*, the retaining device 75 is provided with a hard point 84 so that it can be activated at the start of a downward rotation sequence over a determined angular range in which an applied force for deploying the movable part 12 of the headrest 10 is greater than the effort necessary to deploy the movable part 12 over the remainder of a rotation sequence extending from the end of the predetermined angular range to the deployed position.

For this purpose, the retaining device 75 comprises an arm 88 movable in rotation relative to the movable part 12 and an elastic member 89, such as a spring, urging the arm 88 against the hard point 84 on the central part 11. In this case, the hard point 87 is formed by a rounded slope. To move the movable part 12 into the deployed position, it is necessary to compress the spring 89 at least partially so that the arm 88 can move over the obstacle formed by the rounded slope. Compressing the spring 89 increases the effort to be applied to deploy the mobile part 12 over the determined angular range. The value of this angular range can be adapted according to the shape and extent of the rounded slope.

Of course, the different characteristics, variants and/or embodiments of the present invention can be associated with each other in various combinations insofar as they are not incompatible with or exclusive of one another.

Furthermore, the invention is not limited to the embodiments described above and provided solely by way of example. It encompasses various modifications, alternative forms and other variants which a person skilled in the art may envisage in the context of the present: invention and in particular any combination of the various operating modes described above may be taken separately or in combination.

The invention claimed is:

1. A headrest for a seat comprising:

a central part on which the head of a passenger can be laid, said central part comprising a structural plate, and a movable part mounted on the central part via a central pivot connection having a horizontal axis of rotation, said central pivot connection being arranged on one lower edge of the central part, so that the movable part is movable between a raised position and a deployed position in which the movable part extends substantially perpendicular to the central part, wherein said movable part comprises:

an elongated support extending longitudinally along a lower edge of the structural plate, said elongated support being mounted on the central part via a rotating friction member forming the central pivot connection, and two side head support fins, each side head support fin being mounted on a corresponding end of the support via an end pivot connection having an end axis of rotation, each end axis of rotation having a substantially vertical orientation when the movable part is in the raised position, each end axis of rotation having an orientation substantially perpendicular to the central part when the movable part is in the deployed position, so that each side head support fin can rotate about the corresponding end axis of rotation in order to take the raised position in which the side head support fin is brought closer to the passenger's cheek.

2. The headrest according to claim 1, wherein the movable part is U-shaped.

3. The headrest according to claim 1, wherein the headrest is movable between a high position and a low position so that the headrest can be adapted to different sizes of passengers.

4. The headrest according to claim 1, wherein the movable part extends parallel to the central part when the headrest is in the raised position.

5. The headrest according to claim 1, wherein the central pivot connection is formed by a rotating friction member for maintaining the movable part selectively in the raised position or in the deployed position.

6. The headrest according to claim 1, wherein each end pivot connection is formed by a hinge having a first portion fixed on one end of the support and a second portion fixed on a corresponding head support fin.

7. The headrest according to claim 1, further comprising a modular fixation interface on a backrest structure.

8. The headrest according to claim 7, wherein the modular fixation interface comprises two pads for cooperating with respective guide rails carried by the backrest structure.

9. The headrest according to claim 1, further comprising an elastic return member for automatically moving the movable part from the deployed position to the raised position when the head of the passenger is not laid on the movable part.

10. The headrest according to claim 1, wherein, when the movable part is in the deployed position, an upper face of a side fin forms a fixed non-zero angle relative to a lower face of said side fin.

11. The headrest according to claim 1, further comprising a retaining device for the movable part under the action of a strong acceleration of the headrest.

12. The headrest according to claim 11, wherein the retaining device comprises a ball associated with a rod mounted so as to slide between a default position and an active position in which the rod pushes said ball into a housing in order to block the rotation of the movable part relative to the central part, a passage from the default position to the active position of the rod occurring under the action of the strong acceleration of the headrest.

13. The headrest according to claim 11, wherein the retaining device comprises a ball and a part fixed on the movable part of the headrest, said part carrying a pivoting latch capable of rotating under an effect of a movement of the ball generated by acceleration so as to block the movable part of the headrest.

14. The headrest according to claim 11, wherein the retaining device is provided with a hard point so that the headrest can be activated at a start of a downward rotation sequence over a determined angular range in which an applied force for deploying the movable part of the headrest is greater than a force necessary to deploy the movable part over the remainder of a rotation sequence extending from the end of the predetermined angular range to the deployed position.

15. A seat comprising a headrest as defined according to claim 1.

* * * * *